United States Patent
Sullivan et al.

(10) Patent No.: US 9,875,061 B2
(45) Date of Patent: *Jan. 23, 2018

(54) DISTRIBUTED BACKUP SYSTEM

(71) Applicant: ServiceNow, Inc., Santa Clara, CA (US)

(72) Inventors: Josiah Sullivan, Sammamish, WA (US); Jeremy Norris, Poway, CA (US); Vincent Seguin, Encinitas, CA (US); Joe Davis, Carlsbad, CA (US); Siddharth Shah, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,530

(22) Filed: Dec. 5, 2016

(65) Prior Publication Data

US 2017/0083242 A1 Mar. 23, 2017

Related U.S. Application Data

(63) Continuation of application No. 14/529,462, filed on Oct. 31, 2014, now Pat. No. 9,516,108.

(51) Int. Cl.
*G06F 15/16* (2006.01)
*G06F 3/06* (2006.01)
(Continued)

(52) U.S. Cl.
CPC .............. *G06F 3/065* (2013.01); *G06F 3/067* (2013.01); *G06F 3/0608* (2013.01); *G06F 3/0619* (2013.01); *G06F 11/1464* (2013.01); *H04L 67/1095* (2013.01); *H04L 67/1097* (2013.01); *H04L 67/42* (2013.01); *H04L 67/1031* (2013.01)

(58) Field of Classification Search
CPC ..... G06F 3/067; G06F 3/0608; H04L 67/1097
See application file for complete search history.

(56) References Cited

U.S. PATENT DOCUMENTS 7,831,562 B1 * 11/2010 Devos ................ G06F 11/1458 707/640
8,352,692 B1 * 1/2013 Jordan ................ H04L 67/1093 711/162

(Continued)

*Primary Examiner* — Hieu Hoang
(74) *Attorney, Agent, or Firm* — Fletcher Yoder, P.C.

(57) ABSTRACT

A distributed backup method includes defining a server group having a plurality of server computers, and providing each server computer with an identical backup policy and an identical storage policy. The method also includes transmitting, at each server computer of the server group to every other server computer of the server group, advertisement messages describing available storage space for storing backups, and receiving, at each server computer from the server, at least some of the advertisement messages. The method also includes identifying, at a first server computer using the backup policy, at least a first service to be backed up, selecting a second server computer using the received advertisement messages, transmitting, from the first server computer to the second server computer, a backup including information corresponding to the at least one service, and storing the backup, by the second server computer using the storage policy.

18 Claims, 9 Drawing Sheets

(51) Int. Cl.
    *H04L 29/08*     (2006.01)
    *G06F 11/14*     (2006.01)
    *H04L 29/06*     (2006.01)

(56) References Cited

U.S. PATENT DOCUMENTS

| | | | |
|---|---|---|---|
| 9,003,144 B1 * | 4/2015 | Hayes | G06F 3/065 |
| | | | 711/103 |
| 9,516,108 B1 * | 12/2016 | Sullivan | H04L 67/1095 |
| 2006/0117046 A1 * | 6/2006 | Robertson | H04L 67/16 |
| 2008/0077635 A1 * | 3/2008 | Sporny | G06F 17/30206 |
| 2015/0058568 A1 * | 2/2015 | Fong | G06F 12/128 |
| | | | 711/122 |
| 2015/0261455 A1 * | 9/2015 | Gough | G06F 11/14 |
| | | | 714/6.24 |
| 2015/0347451 A1 * | 12/2015 | Lee | G06F 17/30194 |
| | | | 707/610 |
| 2015/0381729 A1 * | 12/2015 | Manohar | H04L 67/1097 |
| | | | 709/203 |
| 2016/0028587 A1 * | 1/2016 | Garg | H04L 41/0806 |
| | | | 709/224 |

* cited by examiner

DISTRIBUTED BACKUP SYSTEM

CROSS-REFERENCE TO RELATED APPLICATIONS

Under 35 U.S.C. §120, this application is a continuation of U.S. patent application Ser. No. 14/529,462 filed on Oct. 31, 2014, which is incorporated by reference herein in its entirety for all purposes.

BACKGROUND

In the field of data storage, the term "backup" refers to the process of storing and archiving information to allow its restoration if needed, such as after a data loss or hardware failure. In a simple example, two copies of a data file can be maintained on a single physical storage medium to allow the information to be restored if one of the copies becomes corrupted. More sophisticated examples store backup copies on different physical media which are sometimes in different geographic locations, and employ incremental backup strategies that store complete copies of data and information describing subsequent changes to portions of the complete data.

Backup copies are often stored on low-performance storage devices that have low data transfer rates. This can lead to lengthy restore times, which can lead to inconvenience for the persons who are unable to access the data being restored and for the persons overseeing the restoration process. Traditional methods to improve restore times include monolithic, consolidated storage arrays that are costly and add multiple layers of switching and cabling complexity to a data center.

SUMMARY

One aspect of the disclosed embodiments is a distributed backup method that includes defining a server group having a plurality of server computers, and providing each server computer with an identical backup policy and an identical storage policy. The method also includes transmitting, at each server computer of the server group to every other server computer of the server group, advertisement messages describing available storage space for storing backups and receiving, at each server computer of the server group, at least some of the advertisement messages. The method also includes identifying, at a first server computer of the server group using the backup policy, at least a first service to be backed up. The method also includes selecting, at the first server computer using the received advertisement messages, a second server computer of the server group and transmitting, from the first server computer to the second server computer, a backup including information corresponding to the at least one service. The method also includes storing the backup, by the second server computer using the storage policy.

Another aspect of the disclosed embodiments is a method that includes defining a server group having a plurality of server computers, wherein all of the server computers of the server group are disposed in a server rack and are connected by a dedicated local area network connection that is disposed entirely within the server rack, and each server computer of the server group includes a high speed storage device and a low speed storage device. The method also includes providing each server computer with an identical backup policy and an identical storage policy. The method also includes transmitting, at each server computer of the server group to every other server computer of the server group, advertisement messages describing available storage space for storing backups and receiving, at each server computer of the server group, at least some of the advertisement messages. The method also includes identifying, at a first server computer of the server group using the backup policy, at least a first service to be backed up and selecting, at the first server computer using the received advertisement messages, a second server computer of the server group. The method also includes transmitting, from the first server computer to the second server computer, a backup including information corresponding to the at least one service, wherein transmitting the backup is performed using only the dedicated local area network connection. The method also includes storing the backup, by the second server computer on the high speed storage device using the storage policy and subsequent to storing the backup, moving the backup from the high speed storage device to the low speed storage device upon determining that the backup has an age that is greater than a first maximum age.

Another aspect of the disclosed embodiments is a distributed backup system that includes a server group that includes a plurality of server computers, and a local area network connection that interconnects all of the server computers in the server group for transmission of backup information. Each server computer of the server group includes a backup manager that transmits advertisement messages to all other server computers in the server group describing available storage space for storing backups, receives advertisement messages from all other server computers in the server group, transmits backups to one or more server computers of the server group, and receives backups from one or more server computers of the server group. Each server computer of the server group also includes a backup policy that is executed by the backup manager to cause the respective server computer to select another server of the server group as a backup destination based on the received advertisement messages and initiate transmission of a backup for at least one service executed by the respective server computer, and a storage policy that is executed by the backup manager of each server computer to control storage and deletion of received backups.

BRIEF DESCRIPTION OF THE DRAWINGS

The description herein makes reference to the accompanying drawings wherein like reference numerals refer to like parts throughout the several views, and wherein.

DETAILED DESCRIPTION

In the systems and methods described herein, backups are performed within a server group that includes a plurality of servers that are connected to one another by a high speed network. All of the servers execute one or more services and cause backup copies of these services to be stored by other servers in the server group according to a backup policy. All of the servers store backup copies received from other servers on one of a high speed storage device or a low speed storage device according to a storage policy. In one implementation, all of the servers of the server group are located within a single server rack to further expedite backup and restore operations.

Figure 1:
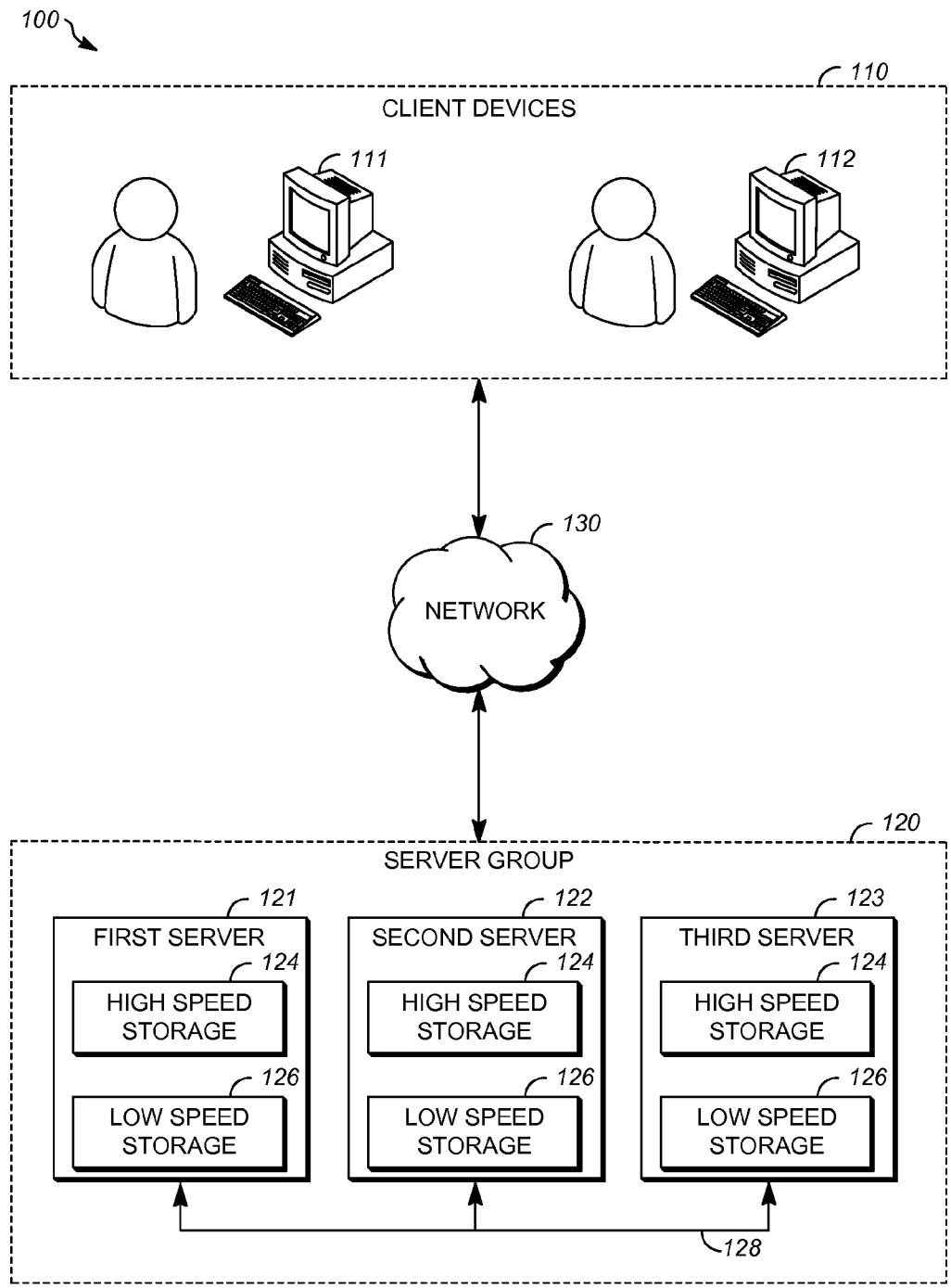
FIG. 1 is a schematic of an example of a computing environment in which a distributed backup system can be implemented.

FIG. 1 is a schematic of an example of a computing environment 100 in which a distributed backup system can be implemented. The computing environment 100 can include one or more client devices 110 and a server group 120 that includes a plurality of server computers. The client devices 110 are able to communicate with the server group 120 in order to utilize one or more services that are provided by the server group 120, such as a hosted application. As an example, the server group 120 can be located in a datacenter, and the client devices 110 can communicate with the server group 120 using a network 130 in order to access the one or more services.

The one or more client devices 110 can be or include, for example, one or more of a mobile phone, a tablet computer, a laptop computer, a notebook computer, a desktop computer, and the like. In some implementations, the one or more client devices 110 are organized in one or more groups, and each group includes multiple client devices. These groups can correspond to organizations such as a business or an educational institution.

In the illustrated example, the one or more client devices 110 include a first client device 111 and a second client device 112 that are each connected to the network 130. However, this is merely an example, and any number of client devices can be included in the computing environment 100. For example, there may be hundreds or thousands of client devices that access services provided by the server computers of the server group.

The server group 120 includes a plurality of separate physical computing devices that are interconnected for transmission of signals and/or data between them. As one example the separate physical computing devices of the server group 120 can be connected to one another by a dedicated local area network connection 128 that transmits information solely within the server group 120. As another example the separate physical computing devices of the server group 120 can communicate via the network 130.

Each separate physical computing device includes, for example, one or more processors, one or more memory devices, and one or more storage devices that are managed by a file system of the separate physical computing device. The plurality of separate physical computing devices of the server group 120 can include a first server computer 121, a second server computing 122, and a third server computer 123. Each of the first server computer 121, the second server computer 122, and the third server computer 123 are each equipped with a high speed storage device 124 and a low speed storage device 126 as well as other conventional components. The high speed storage device 124 and the low speed storage device are separate physical devices that are separately addressable by the file system (i.e. different logical drives) of the respective server computer to which they are attached. The high speed storage device 124 has a higher data transfer rate than the low speed storage device 126. In one implementation, the high speed storage device 124 is a solid-state drive (SSD) and the low speed storage device 126 is a hard disk drive (HDD). In another implementation, the high speed storage device 124 is a hybrid or fusion drive (e.g. an SSD and HDD that are managed as a single logical drive) and the low speed storage device 126 is an HDD.

Each of the separate physical computing devices of the server group 120 can execute one or more services. Examples of services include a web server (e.g., an Apache installation), an application server (e.g., a Java Virtual Machine) and a database (e.g., a MySQL database). As used herein, the term database refers to a collection of data that can be, as examples, created, queried, and/or updated by a database management system.

The network 130 can, for example, be the Internet. The network 130 can also be or include a local area network (LAN), wide area network (WAN), virtual private network (VPN), or any other means of transferring data between the client devices 110 and the server group 120. The network 130 may include network hardware such as routers, switches, load balancers, and/or other network devices. For example, the network 130 may have one or more load balancers for routing traffic from the network 130 to various servers including the servers of the server group 120.

Figure 2:
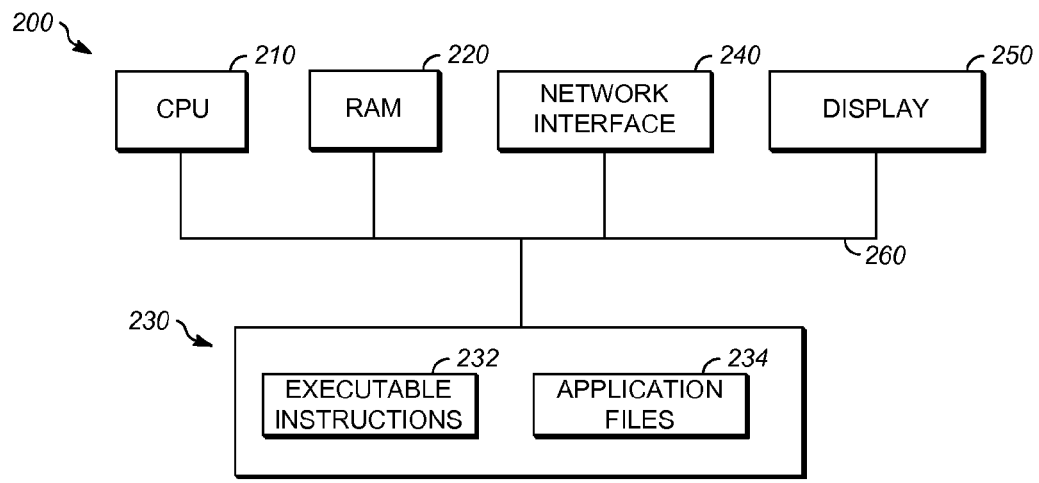
FIG. 2 is a block diagram of 2 is a block diagram of an example of a computer system.

FIG. 2 is a block diagram of an example of a computer system 200 that can be utilized as a client or server of the exemplary computing system. As previously described clients or servers may take the form of a computing system including multiple computing devices, or in the form of a single computing device, for example, a mobile phone, a tablet computer, a laptop computer, a notebook computer, a desktop computer, a server computer and the like.

The internal configuration can include a CPU 210, a RAM 220, a storage 230, a network interface 240, a display 250, and a bus 260. CPU 210 can be a conventional central processing unit. CPU 210 can include single or multiple processors each having single or multiple processing cores. Alternatively, CPU 210 can include another type of device, or multiple devices, capable of manipulating or processing information now-existing or hereafter developed.

The RAM 220 can be Random Access Memory or any other suitable type of storage device. The RAM 220 can include executable instructions and data for immediate access by CPU 210. The RAM 220 typically comprises one or more DRAM modules such as DDR SDRAM. Alternatively, the RAM 220 can include another type of device, or multiple devices, capable of storing data for processing by the CPU 210 now-existing or hereafter developed. The CPU 210 can access and manipulate data in the RAM 220 via the bus 260.

The storage 230 can include one or more storage devices such as solid state or magnetic storage media. In the case of the server computers of the server group 120, the storage 202 includes the high speed storage device 124 and the low speed storage device 126 as previously described. The storage 230 is used to store information that is accessed by the CPU 210 via the bus 260, such as executable instructions 232 and application files 234 along with other data. The executable instructions 232 can include, for example, an operating system and one or more application programs for loading in whole or part into RAM 201 and to be executed by the CPU 210. The operating system can be, for example, a Windows, Mac OS X, and/or Linux operating system. The operating system can include a file system that manages the storage 230, or a separate file system can be provided as part of the executable instructions 232. The application program can include, for example, a web browser, web server, and/or database server. The application files 234 can, for example, include user files, databases, and configuration information.

The network interface 240 and the display 250 can be coupled to the CPU 210 via the bus 260. The network interface 240 allows the computer system 200 to communicate via a network, such as the network 130, and may take the form of a wired network interface such as Ethernet or a wireless network interface.

The display 250 can be coupled to the CPU 210 via the bus 260. Other output devices that permit a user to program or otherwise use the client or server can be provided in addition to or as an alternative to the display 250. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit display 250. The operations of the CPU 210 can be distributed across multiple machines which can be coupled directly or across a local area or other network. The RAM 201 or storage 202 can be distributed across multiple machines such as network-based memory or memory in multiple machines performing the operations of clients or servers.

Figure 3:
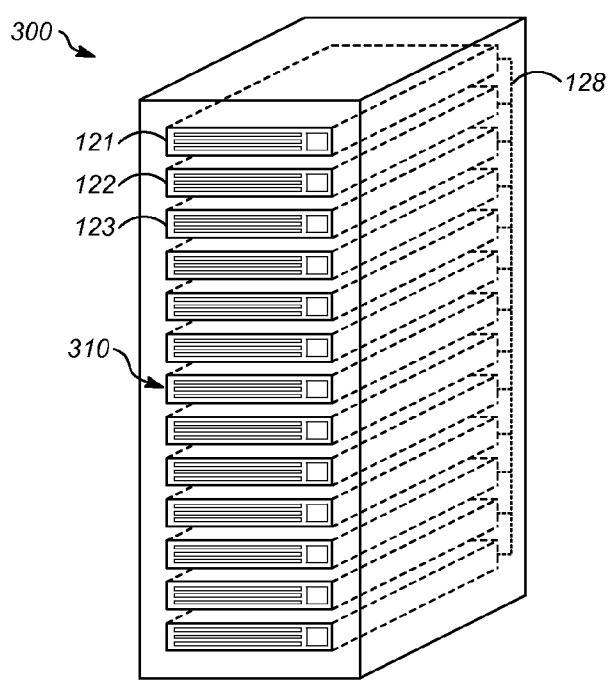
FIG. 3 is an illustration showing a physical hardware configuration for a distributed backup system.

FIG. 3 shows a physical hardware configuration 300 for the distributed backup system. The physical hardware configuration 300 includes an enclosure such as a server rack 310. The server rack 310 is of conventional construction. For example the server rack 310 can be a 19-inch rack as described by any of Electronic Industries Alliance standard EIA-310-D, Consumer Electronics Association standard CEA-310-E, International Electrotechnical Commission standard IEC 60297, or Deutsches Institut für Normung standard DIN 41494. Other types of server racks can be utilized.

The server rack 310 houses the servers from the server group 120. All of the servers from the server group 120 can be connected to and located in the server rack 310, including the first server computer 121, the second server computer 122, and the third server computer 123. The dedicated local area network connection 128 can be located inside the server rack 310. Networking equipment (not shown) such as one or more network switches can be located in the server rack 310 as part of the dedicated local area network connection 128 to facilitate network communications (i.e. transmission of signals and/or data) between servers from the server group 120.

In some implementations, all of the server computers from the server group 120 are disposed in the server rack 310, the dedicated local area network connection 128 is located entirely in the server rack 310, and the backup operations described herein are performed via network communications that utilize the dedicated local area network connection 128 exclusively. In such implementations, the network communications that are utilized to perform backup operations do not leave the server rack 310 such as via a local area connection that connects the server group 120 to other computing devices that are located in the same facility (e.g. a data center) but are not located in the server rack 310, or via the network 130. Although a single server rack 310 is shown, it should be understood that a facility, such as a data center, could include numerous (e.g. hundreds) of the server racks 310, with each housing a separate and independent server group that functions as described with respect to the server group 120.

Figure 4:
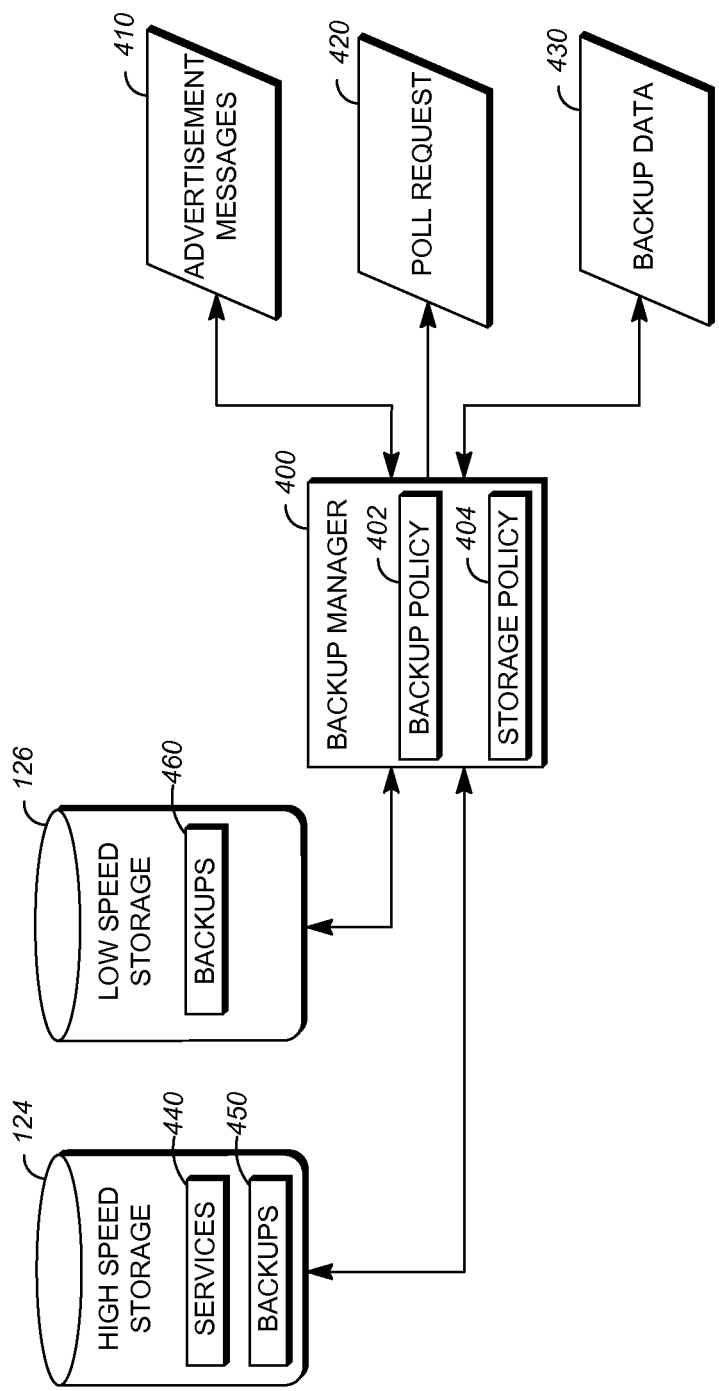
FIG. 4 is a block diagram showing operation of a backup manager.

FIG. 4 shows operation of a backup manager 400 that is provided on each of the server computers of the server group 120, with each backup manager 400 controlling backup and storage operations for the respective server computer on which it is executed. As will be explained in detail herein, each backup manager 400 is solely responsible for determining when to back up information on the server computer on which it is executed, and which of the other server computers in the server group 120 will be utilized to store the information. An identical copy of the backup manager 400 can be executed by each server computer from the server group 120, including the first server computer 121, the second server computer 122, and the third server computer 123.

On each of the server computers of the server group 120, the high speed storage device 124 stores information corresponding to services 440 and a first group of backups 450, while the low speed storage device 126 stores a second group of backups 460. The services 440 include applications that are being executed by the respective server computer and/or information being used by applications that are being executed by the respective server computer. The first group of backups 450 and the second group of backups 460 each include information corresponding to one or more services that are executing on another server computer from the server group 120 that has been received and stored as a backup as a result of a backup operation.

The backup manager 400 monitors the contents of the high speed storage device 124 and the low speed storage device 126, and determines how much space is available for storing backups. The backup manager 400 sends an advertisement message 410 that indicates to other server computers in the server group 120 the extent to the server computer that sent the advertisement message 410 is available for storing backups. Each advertisement message can include information describing the amount of space available for backups on a particular server computer from the server group 120, the maximum size backup that can be accepted, and a list of the backups that are currently stored on that server computer. The backup manager 400 can adjust the reported amounts regarding available storage so that services executing on the respective server computer do not fail due to over allocation.

Each advertisement message 410 is sent from one of the server computers in the server group 120 to some or all other server computers in the server group 120. When the advertisement message 410 is sent from the first server computer 121, it can be received by the second server computer 122, the third server computer 123, and any other server computers that are present in the server group. The backup manager 400 of each server computer, upon receiving the advertisement message, stores the information contained in the advertisement message in a map that includes the identity of each server computer in the server group 120 and information describing its currently stored backups and ability to store additional backups.

The advertisement messages 410 can be sent such that they reach all of the server computers in the server group 120, without requiring explicit knowledge by the sending node of the identities of the other server computers in the server group 120. Implementations can vary and in some implementations, each advertisement message can be sent to each of the other server computers and in others, sending of advertisement messages can be configured such that each of the other server computers receives at least one advertisement message out of a certain number of advertisement messages that are sent. As one example, the sending of advertisement messages can be accomplished by dedicated networking hardware for sending and receiving the advertisement messages 410, such as the dedicated local area network connection 128. As another example, this can be accomplished by sending the advertisement messages to a range of IP addresses that are reserved for members of the server group 120. Because the backup manager 400 on each of the server computers of the server group 120 receives the advertisement messages 410 from all other members of the server group 120, the backup manager 400 of each of the server computers automatically discovers and constantly monitors the other server computers in the server group 120. Thus, backup operations in the server group 120 can be self-managing and self-repairing.

The advertisement messages 410 can be sent periodically, such as on a fixed or non-fixed schedule. An example of a fixed schedule includes sending the advertisement message 410 after a set period of time passes, such as 30 minutes. An example of a non-fixed schedule includes sending the advertisement message 410 after a change in the amount of storage space available for backups, such as sending the advertisement message upon a five percent increase or decrease in the amount of storage space available for backups.

The backup manager 400 on each of the server computers of the server group 120 includes a backup policy 402 that controls how the services on that respective server computer are to be backed up. The backup policy 402 on each of the server computers is identical. The backup policy specifies one or more conditions, and triggers a backup if the policy is violated or if a violation is imminent. As an example, the backup policy 402 can state a maximum period of time that data corresponding to one of the services 440 can be present without being backed up. If that period of time has elapsed, the backup manager 400 determines that a backup is to be performed, based on violation of the backup policy 402. The backup manager 400 can analyze the services 440 periodically for compliance with the backup policy 402. For example, the backup manager 400 can analyze the services 440 once every ten minutes to determine whether the backup policy 402 has been violated.

Upon determining a current or imminent violation of the backup policy 402, the backup manager 400 on a respective one of the server computers of the server group will initiate a new backup. Initiating a new backup includes selecting, by the backup manager 400 that is initiating the backup, which of the other server computers of the server group 120 that backup will be stored at. The backup manager 400 makes the selection based on the ability of one of the other server computers to store the backup as well as other factors such as the amount of storage available at each server computer and the amount of high speed storage available at each server computer. For example, the advertisement messages 410 can include information describing the amount of high speed storage available at respective ones of the server computers from the server group, and the backup manager 400 can be configured to favor storage at server computers having the greatest amounts of high speed storage available regardless of the amount of total storage available.

This selection can be made using the information previously received from the backup managers 400 operating on other server computers via the advertisement messages 410. In some implementations, a poll request 420 is then sent one of the other server computers to confirm that the backup can be stored by it. In other implementations, the selection is not made based on previously received information, but instead, the poll request 420 is sent to some or all of the other server computers in the server group 120, information such as the advertisement messages 410 is received in response, and the selection is made using this information.

Once the backup manager 400 has selected a destination for the backup, backup data 430 is transmitted from the source to the destination, where the source is the server computer hosting the service 440 being backed up and the destination is the server computer that will store the backup.

Once the backup manager 400 sends the backup data 430 to another server computer for storage, it cannot exercise any control over storage and disposition of the backup. Instead, the backup manager 400 on each of the server computers in the server group exercises complete control over the backups that it is storing, with all decisions as storage and deletion of backups being made using a storage policy 404. The backup manager 400 for each of the server computers in the server group 120 includes a copy of the storage policy 404, which is identical for all of the server computers in the server group 120.

When the backup manager 400 receives the backup data 430 from another server computer, it stores it using one of the high speed storage device 124 or the low speed storage device 126 according to the storage policy 404. The storage policy 404 causes recent backups to be stored in the first group of backups 450 on the high speed storage device 124 if space is available on the high speed storage device 124. If no space is available on the high speed storage device 124, the information can be stored in the second group of backups 460 on the low speed storage device 126.

The backup manager 400 periodically moves and deletes backups based on the instructions included in the storage policy 404. The storage policy 404 is implemented individually by the respective backup manager 400 of each server computer to manage its own backups individually. The storage policy 404 is a time-based policy. For example, the storage policy 404 can specify a first maximum age for backups stored in the first group of backups 450, and a second maximum age for backups stored in the second group of backups 460. When a backup stored in the first group of backup 450 reaches the first maximum age it is moved from the first group of backups 450 to the second group of backups 460 on the low speed storage device 126 on the same server computer. When a backup stored in the second group of backups 460 on the low speed storage device 126 reaches a second maximum age, it is deleted.

When restoration is required, the map stored at any of the server computers of the server group can be utilized to locate the needed backup. The restoration target node then requests the backup from the restoration source node, which transmits the information as the backup data 430.

As a result of implementing the backup policy 402 and the storage policy 404 using the respective backup manager 400 on each server computer of the server group 120, a backup for any of the services 440 on any of the server computers will always be available in the server group 120, which can be contained in a single server rack 310. Recent backups are often available on the high speed storage device 124, which speeds the restoration process after non-catastrophic data losses, such as accidental deletion. At the same time, very large backups that cannot be accommodated the high speed storage device 124 alone can still be backed up to the low speed storage device 126.

Figure 5:
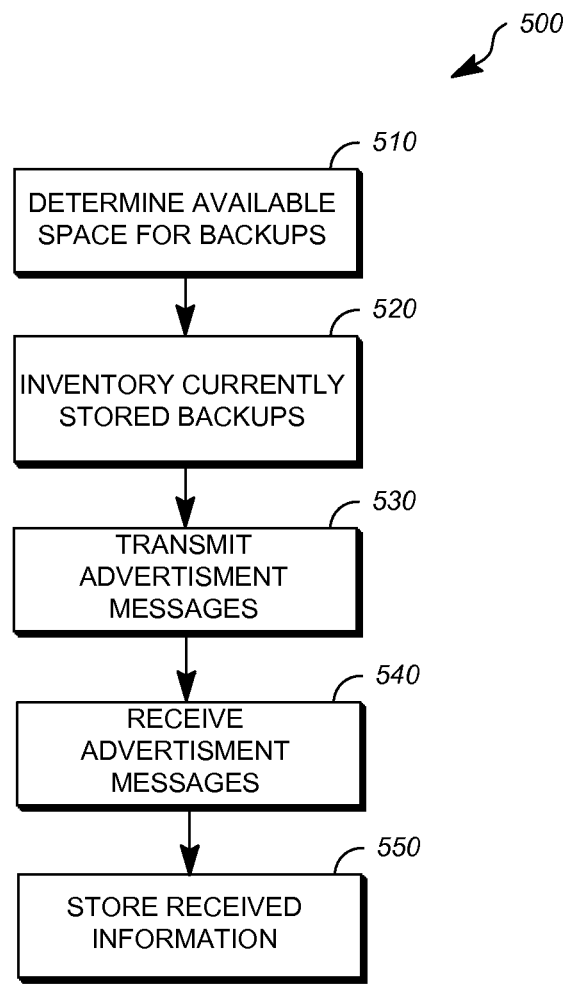
FIG. 5 is a flowchart showing an example of a process for mapping a server group.

FIG. 5 is a flowchart showing an example of a process for mapping a server group in the distributed backup system. The operations described in connection with the process 500 are performed at each server computer of the server group 120, such as at the first server computer 121 of the server group 120. The operations described in connection with the process 500 can be embodied as a non-transitory computer readable storage medium including program instructions executable by one or more processors that, when executed, cause the one or more processors to perform the operations. By way of example, the operations of the process 500 could be stored at the RAM 220 of the first server computer 121 and be executable by the CPU 210 thereof. The operations of the process 500 will be described in connection with the first server computer 121, but are performed similarly by all of the server computers of the server group 120.

In operation 510 the first server computer 121 determines the amount of storage space that is available for storing backups from other server computers in the server group 120. This can include, for example, accessing each of the high speed storage device 124 and the low speed storage device 126 to ascertain the amount of free space on each drive. Since all of the free space may not be available for backups (i.e. a portion of it may be set aside for the services 440), the amount of space available for backups is calculated based on the total free space less any free space set aside for other uses. A policy or formula can be utilized for making this determination.

In operation 520, the first server computer 121 creates or updates an inventory of currently stored backups, such as by accessing the high speed storage device 124 and the low speed storage device 126 to identify the backups stored in each of the first group of backups 450 and the second group of backups 460 to determine which backups are present in each.

In operation 530, the first server computer generates and transmits one of the advertisement messages 410, as previously described. The advertisement message 410 transmitted in operation 530 can include the amount of storage space available for backups as determined in operation 510 and the inventory of currently stored backups as determined in operation 520. The advertisement message 410 can also specify the amount of space available for backups on the high speed storage device 124 and the low speed storage device 126 separately. The advertisement message 410 can also specify the largest size backup that can be accommodated by the first server computer 121. After it is generated, the advertisement message 410 is transmitted by the first server computer 121 to all other server computers in the server group 120, as previously described.

In operation 540, the first server computer 121 receives advertisement messages 410 from some or all of the other server computers in the server group 120, such as the second server computer 122 and the third server computer 123. This information is stored by the first server computer 121 at operation 550, such as in a map, as previously described.

Figure 6:
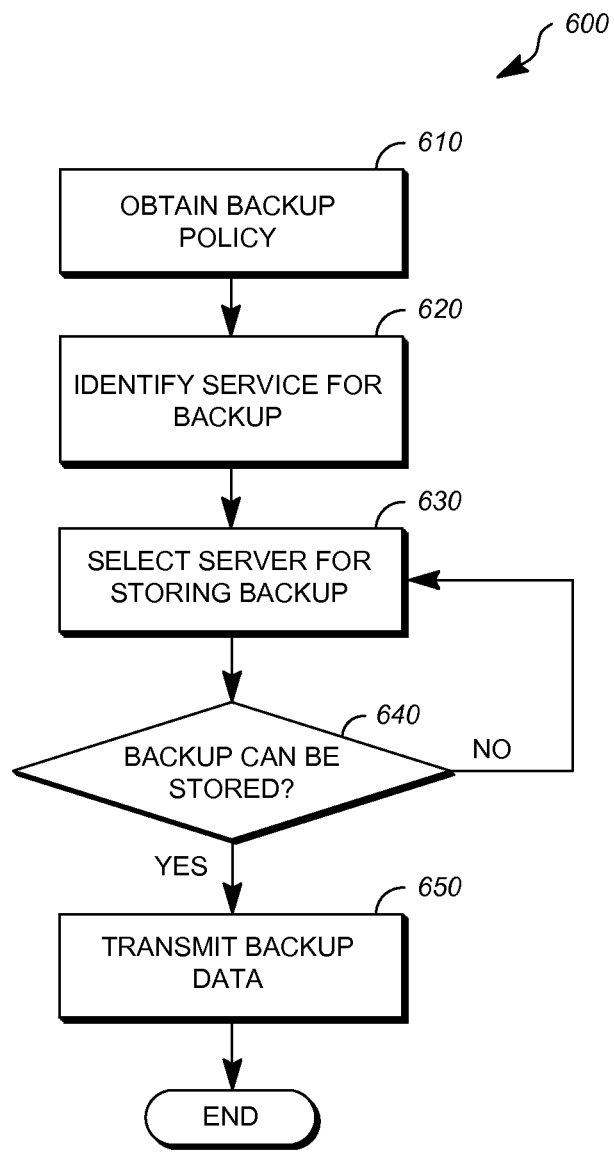
FIG. 6 is a flowchart showing an example of backup process in the distributed backup system.

FIG. 6 is a flowchart showing an example of a backup process in the distributed backup system. The operations described in connection with the process 600 are performed at each server computer of the server group 120, such as at the first server computer 121 of the server group 120. The operations described in connection with the process 600 can be embodied as a non-transitory computer readable storage medium including program instructions executable by one or more processors that, when executed, cause the one or more processors to perform the operations. By way of example, the operations of the process 600 could be stored at the RAM 220 of the first server computer 121 and be executable by the CPU 210 thereof. The operations of the process 600 will be described in connection with the first server computer 121, but are performed similarly by all of the server computers of the server group 120.

In operation 610, the first server computer 121 obtains a copy of the backup policy 402, such as by opening a previously stored copy of the backup policy 402 from the high speed storage device 124. The backup policy 402 can be stored individually at each server computer of the server group 120, but is identical at each server computer of the server group 120.

In operation 620, the first server computer 121 identifies a service to be backed up. The service to be backed up can be one of the services 440 that are stored on the high speed storage device 124 and are executed by the first server computer 121. The service to be backed up is identified using the backup policy 402. The backup policy 402 can be a time based policy that specifies a maximum amount of time that can elapse after change or creation of information associated with the service before a backup must be performed. For example, the backup policy 402 can specify that a backup must be performed of information associated with a service within 24 hours of change or creation of that information.

In operation 630, the first server computer 121 selects a server computer for storing the backup. In particular, another server computer from the server group 120 is selected based on the advertisement messages 410 received from other server computers. The selection can be made using rules in the backup policy 402. As one example, the server computer with the largest amount of available backup storage can be selected. As another example the server computer with the largest amount of available backup storage on its respective high speed storage device 124 can be selected. As another example, the absence, presence, or age of previous backups of the selected service at a particular server computer can be utilized as a basis for the selection. Other factors can be utilized.

In operation 640, the first server computer 121 polls the server computer selected at operation 630 to confirm that the backup can be stored and receives a response. This can be performed, for example, as described with respect to the poll request 420. The information received from the second server computer 122 in response to this request can identify the physical or logical drive at which the backup is to be stored by the first server computer 121, in addition to indicating that the backup can or cannot be stored. If the backup can be stored at the selected server computer, the process advances to operation 650. Otherwise, the process returns to operation 630 for selection of a different server computer from the server group 120. In some implementations, operation 640 is omitted, with the advertisement messages 410 being relied on without subsequent polling. In such implementations, selecting one of the server computers at operation 630 can include the time elapsed since receipt of an advertisement message from a particular server computer as a factor.

In operation 650, a backup operation is performed. In the backup operation, the information from the service being backed up is transmitted to the server computer selected in operation 630 as the backup data 430. For example, the backup data 430 can be transmitted from the first server computer 121 to the second server computer 122 via the dedicated local area network connection 128. This can be done, for example, by streaming the information directly to the physical or logical drive identified in the response received at the first server computer 121 from the second server computer 122 in operation 640.

Figure 7:
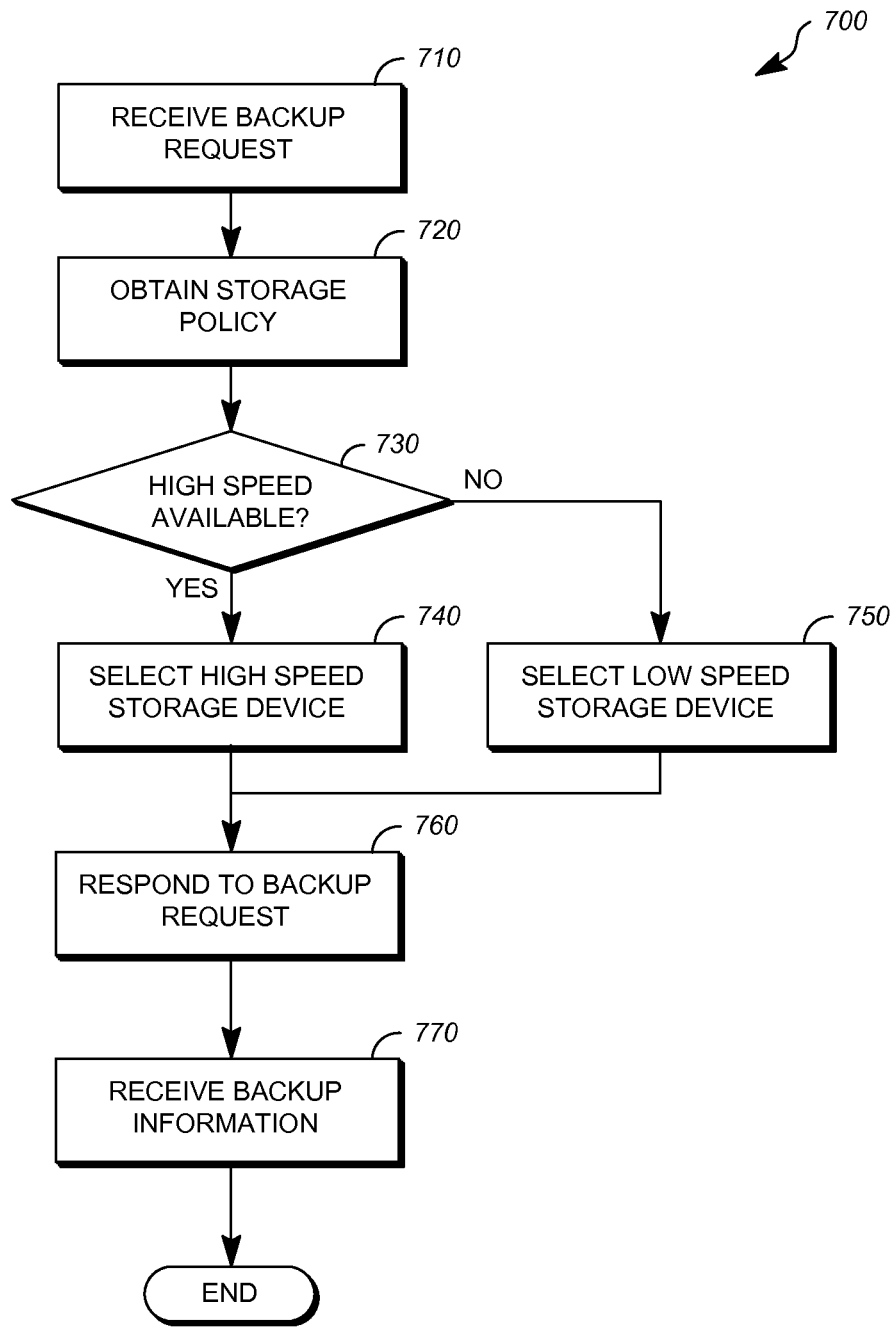
FIG. 7 is a flowchart showing an example of storage process in the distributed backup system.

FIG. 7 is a flowchart showing an example of a storage process in a distributed backup system. The operations described in connection with the process 700 are performed at each server computer of the server group 120, such as at the first server computer 121 of the server group 120. The operations described in connection with the process 700 can be embodied as a non-transitory computer readable storage medium including program instructions executable by one or more processors that, when executed, cause the one or more processors to perform the operations. By way of example, the operations of the process 700 could be stored at the RAM 220 of the second server computer 122 and be executable by the CPU 210 thereof. The operations of the process 700 will be described in connection with the second server computer 122, but are performed similarly by all of the server computers of the server group 120.

In operation 710 a backup request is received at one of the server computers, such as at the second server computer 122 of the server group 120. The backup request that is received at operation 710 can be the request transmitted by the first server computer 121 at operation 640 of the process 600.

In operation 720, the second server computer 122 obtains a copy of the storage policy 404, such as by opening a previously stored copy of the storage policy 404 from the high speed storage device 124. The storage policy 404 can be stored individually at each server computer of the server group 120, but is identical at each server computer of the server group 120.

In response to the backup request that was received at operation 710, the second server computer 122 confirms that it is able to store the backup according to the storage policy 404, and selects one of the high speed storage device 124 or the low speed storage device 126 to use for storage of the backup according to the storage policy 404. For example, in operation 730 the second server computer 122 determines whether there is space available for storing the backup at the high speed storage device 124. If space is available for storing the backup at the high speed storage device 124, the process proceeds to operation 740 where the second server computer 122 selects the high speed storage device 124 for storage of the backup. Otherwise, the process proceeds to operation 750 where the second server computer 122 selects the low speed storage device 126 for storage of the backup.

In operation 760, the second server computer 122 transmits a response to the backup request to the first server computer 121. The response includes information as to whether the second server computer can store the backup, and optionally, indicates whether the backup will be stored at the high speed storage device 124 or low speed storage device 126.

In operation 770, a backup is received at one of the server computers, such as at the second server computer 122 of the server group 120. The backup can be received via the dedicated local area network connection 128 in the form of the backup data 430, as part of the backup operation described at operation 650 of the process 600. The backup can be streamed directly from the first server computer 121 to either of the high speed storage device 124 or the low speed storage device 126 dependent upon the selection made at operation 740 or operation 750. When the backup operation is completed, the process ends.

In implementations where backups are transmitted based on the advertisement messages without subsequent polling and confirmation, operations 710 and 760 can be omitted, and operations 720, 730, 740, and 750 are performed when the advertisement message is sent.

Figure 8:
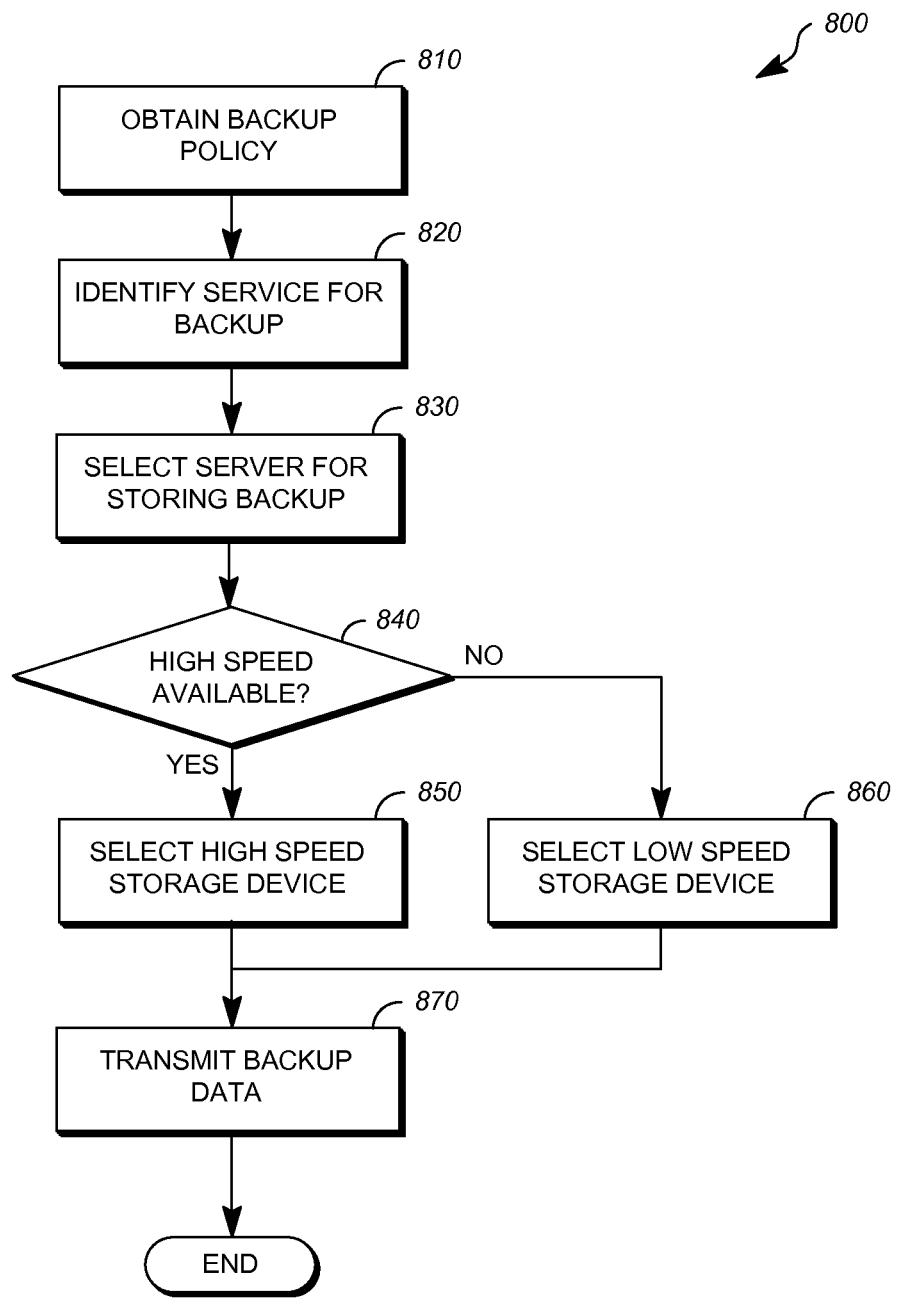
FIG. 8 is a flowchart showing an example of a combined backup and storage process according to an alternative implementation.

In the implementations of backup and storage described with respect to the process 700 of FIG. 7 and the process 800 of FIG. 8, the server receiving the backup determines where the backup will be stored and confirms that it is able to store the backup. The implementation FIG. 8 is a flowchart showing an example of a combined backup and storage process 800 in the distributed backup system according to an alternative implementation in which the backup operation is performed entirely by the server initiating the backup. In the process 800, the decisions regarding how to store the backup are made solely based on previously received advertisement information, and the server receiving the backup only participates to the extent of normal file system operations. The operations described in connection with the process 800 are performed at each server computer of the server group 120, such as at the first server computer 121 of the server group 120. The operations described in connection with the process 800 can be embodied as a non-transitory computer readable storage medium including program instructions executable by one or more processors that, when executed, cause the one or more processors to perform the operations. By way of example, the operations of the process 800 could be stored at the RAM 220 of the first server computer 121 and be executable by the CPU 210 thereof. The operations of the process 800 will be described in connection with the first server computer 121, but are performed similarly by all of the server computers of the server group 120.

In operation 810, the first server computer 121 obtains a copy of the backup policy 402, such as by opening a previously stored copy of the backup policy 402 from the high speed storage device 124. The backup policy 402 can be stored individually at each server computer of the server group 120, but is identical at each server computer of the server group 120.

In operation 820, the first server computer 121 identifies a service to be backed up. The service to be backed up can be one of the services 440 that are stored on the high speed storage device 124 and are executed by the first server computer 121. The service to be backed up is identified using the backup policy 402. The backup policy 402 can be a time based policy that specifies a maximum amount of time that can elapse after change or creation of information associated with the service before a backup must be performed. For example, the backup policy 402 can specify that a backup must be performed of information associated with a service within 24 hours of change or creation of that information.

In operation 830, the first server computer 121 selects a server computer for storing the backup. In particular, another server computer from the server group 120 is selected based on the advertisement messages 410 received from other server computers. The selection can be made using rules in the backup policy 402. As one example, the server computer with the largest amount of available backup storage can be selected. As another example the server computer with the largest amount of available backup storage on its respective high speed storage device 124 can be selected. As another example, the absence, presence, or age of previous backups of the selected service at a particular server computer can be utilized as a basis for the selection. Other factors can be utilized.

In operation 840 the first server computer 121 uses the information from the advertisement messages 410 to determine whether there is space available for storing the backup at the high speed storage device 124 of the second server computer 122. If space is available for storing the backup at the high speed storage device 124, the process proceeds to operation 850 where the first server computer 121 selects the high speed storage device 124 of the second server computer 122 for storage of the backup. Otherwise, the process proceeds to operation 860 where the first server computer 121 selects the low speed storage device 126 of the second server computer for storage of the backup.

In operation 870, a backup operation is performed. In the backup operation, the information from the service being backed up is transmitted to the server computer selected in operation 830 as the backup data 430. For example, the backup data 430 can be transmitted from the first server computer 121 to the second server computer 122 via the dedicated local area network connection 128. This can be done, for example, by streaming the information directly to a physical or logical drive identified by the first server computer at operations 840, 850, and 860.

Figure 9:
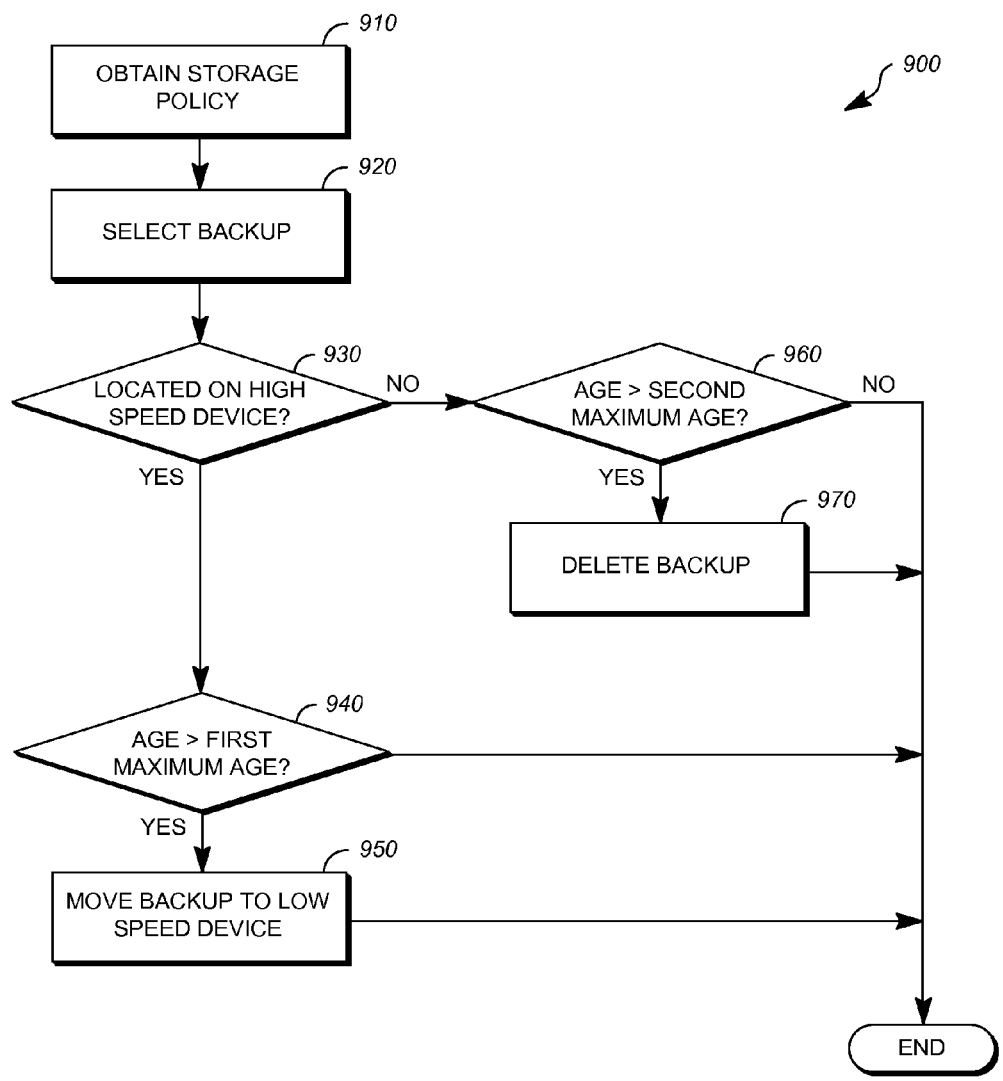
FIG. 9 is a flowchart showing an example of a storage management process in the distributed backup system.

FIG. 9 is a flowchart showing an example of a storage management process in a distributed backup system. The operations described in connection with the process 900 are performed at each server computer of the server group 120, such as at the first server computer 121 of the server group 120. The operations described in connection with the process 900 can be embodied as a non-transitory computer readable storage medium including program instructions executable by one or more processors that, when executed, cause the one or more processors to perform the operations. By way of example, the operations of the process 900 could be stored at the RAM 220 of the second server computer 122 and be executable by the CPU 210 thereof. The operations of the process 900 will be described in connection with the second server computer 122, but are performed similarly by all of the server computers of the server group 120.

In operation 910, the second server computer 122 obtains a copy of the storage policy 404, such as by opening a previously stored copy of the storage policy 404 from the high speed storage device 124. The storage policy 404 can be stored individually at each server computer of the server group 120, but is identical at each server computer of the server group 120.

In operation 910, a backup that is stored by the second server computer 122 is selected for analysis. This selection can be made on the basis of any factor or manner of ordering the stored backups. As one example, the backup manager 400 of the second server computer 122 can make this selection based on a time since the backup was last analyzed As another example, the analysis can be performed using an ordered list of the stored backups and processing them in order, where the list is ordered by any sortable information associated with the backups, such as the date on which they were created.

In operation 920, the age of the selected backup is determined, such as by calculating the number of days, hours, and/or minutes elapsed since the selected backup was created.

In operation 930, if the selected backup is stored on the high speed storage device 124, the process proceeds to operation 930. If the selected backup is stored on the low speed storage device 126, the process proceeds to operation 960.

In operation 940, a determination is made as to whether the backup should be moved from the high speed storage device 124 to the low speed storage device 126. Alternatively, the backup can be moved from the high speed storage device 124 to a storage device in a different server, such as a low speed storage device in a second server. This may be desirable, for example, based on the capacity or usage of the low speed storage device 126. For example, the storage policy 404 can include a first maximum age, which is compared to the age of the backup. If the age of the backup is greater than the first maximum age, the process proceeds to operation 950, where the selected backup is moved from the high speed storage device 124 to the low speed storage device 126. If the age of the backup is less than the first maximum age, the process ends.

In operation 960, a determination is made as to whether the backup should be deleted from the low speed storage device 126. For example, the storage policy 404 can include a second maximum age, which is compared to the age of the backup. If the age of the backup is greater than the second maximum age, the process proceeds to operation 970, where the selected backup is deleted from the low speed storage device 126. The selected backup can optionally be moved to a separate backup system when it is deleted from the low speed storage device. If the age of the backup is less than the second maximum age, the process ends.

Figure 10:
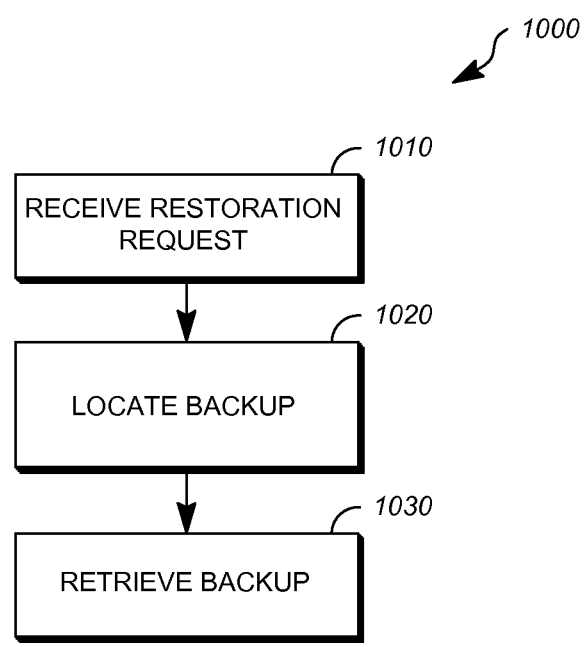
FIG. 10 is a flowchart showing an example of a restoration process in the distributed backup system.

In the event that restoration of a backup is needed, any of the server computers can perform a restoration operation by identifying the location of the backup using the information received in the advertisement messages 410. For example, FIG. 10 is a flowchart showing an example of a restoration process in a distributed backup system. The operations described in connection with the process 1000 are performed at each server computer of the server group 120, such as at the first server computer 121 of the server group 120. The operations described in connection with the process 1000 can be embodied as a non-transitory computer readable storage medium including program instructions executable by one or more processors that, when executed, cause the one or more processors to perform the operations. By way of example, the operations of the process 1000 could be stored at the RAM 220 of the first server computer 121 and be executable by the CPU 210 thereof. The operations of the process 900 will be described in connection with the second server computer 122, but are performed similarly by all of the server computers of the server group 120.

In operation 1010 a request for restoration of a previously stored backup is received. For example, the request can identify the backup, be transmitted from one of the client devices 110, and be received at the first server computer 121.

In operation 1020 the location of the backup is identified. This is performed by the server computer that is initiating the restoration operation, such as the first server computer 121. The location of the backup is identified using previously stored information that was received via the advertisement messages 410, which include information identifying the backups stored at each of the servers. For example, this information can identify the server on which the backup is stored, the logical drive on which the backup is stored, and the location and or file names of the relevant backups.

In operation 1030 the backup is transferred from the server at which the backup is stored, as identified in operation 1020, to the server that initiated the restoration process, such as the first server computer 121. The information can by transferred, for example, by streaming the information from its location at the second sever computer 122 to the first server computer 121 using conventional file system operations.

The implementations of the computing devices discussed herein (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the client devices 110 and server computers from the server group 120 do not necessarily have to be implemented in the same manner.

Further, in one embodiment, for example, the client devices 110 and the server computers of the server group 120 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can be implemented using a general purpose computer/processor with a computer program that, when executed, carries out any of the respective techniques, algorithms and/or instructions described herein. In addition or alternatively, for example, a special purpose computer/processor can be utilized which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A backup method for a plurality of computers, the method comprising:
   transmitting a respective message from each of the plurality of computers to each other computer of the plurality of computers, wherein each respective message indicates an extent to which the respective computer that transmitted the respective message is available for storing backups from the other computers of the plurality of computers and an inventory of currently stored backups on the respective computer that transmitted the respective message; and
   based at least in part of the respective messages, storing a backup from one of the computers of the plurality of computers to one of the other computers of the plurality of computers.

2. The method, as set forth in claim 1, wherein each respective message indicates an amount of storage space available for backups in high speed storage of the respective computer that transmitted the respective message and an amount of storage space available for backups in low speed storage of the respective computer that transmitted the respective message.

3. The method, as set forth in claim 1, wherein storing a backup from one the computers of the plurality of computers to one of the other computers of the plurality of computers comprises selecting the one of the other computers of the plurality of computers having the largest amount of storage space available for backups.

4. The method, as set forth in claim 1, wherein storing a backup from one the computers of the plurality of computers to one of the other computers of the plurality of computers comprises selecting the one of the other computers of the plurality of computers having the largest amount of high speed storage space available for backups.

5. The method, as set forth in claim 1, wherein storing a backup from one the computers of the plurality of computers to one of the other computers of the plurality of computers comprises selecting the one of the other computers of the plurality of computers based on the absence, presence or age of previous backups on the one of the other computers of the plurality of computers.

6. The method, as set forth in claim 1, wherein storing a backup from one of the computers of the plurality of computers to one of the other computers of the plurality of computers comprises initially storing the backup on high speed storage of the one of the other computers of the plurality of computers and moving the backup to low speed storage of the one of the other computers of the plurality of computers after a maximum age of the backup is exceeded.

7. A backup method for a plurality of computers, comprising:
   receiving at a receiving computer of the plurality of computers a respective message from each of the other computers of the plurality of computers, wherein each respective message indicates an amount of storage space available for backups in high speed storage of the respective transmitting computer and an amount of storage space available for backups in low speed storage of the respective transmitting computer; and
   based at least in part of the respective messages, transmitting a backup for storage from the receiving computer to a backup computer of the plurality of transmitting computers.

8. The method, as set forth in claim 7, wherein each respective message indicates an inventory of currently stored backups on the respective transmitting computer.

9. The method, as set forth in claim 7, wherein transmitting a backup for storage from the receiving computer to a backup computer of the plurality of transmitting computers comprises selecting the backup computer with the largest amount of storage space available for backups.

10. The method, as set forth in claim 7, wherein transmitting a backup for storage from the receiving computer to a backup computer of the plurality of transmitting computers comprises selecting the backup computer with the largest amount of high speed storage space available for backups.

11. The method, as set forth in claim 7, wherein transmitting a backup for storage from the receiving computer to a backup computer of the plurality of transmitting computers comprises selecting the backup computer based on the absence, presence or age of previous backups on the backup computer.

12. A system comprising:
a memory configured to store instructions;
a processor configured to execute the instructions stored in the memory to cause the system to:
transmit a message from a first computer to a plurality of computers in a computer group in response to a change in an amount of storage space available to store backup from the plurality of computers in the computer group, wherein the message indicates an extent to which the first computer is available to store the backups from the plurality of computers in the computer group; and
based at least in part on the message, store a backup on the first computer from at least one of the plurality of computers in the computer group.

13. The system, as set forth in claim 12, wherein the message indicates an amount of storage space available for backups in high speed storage of the first computer and an amount of storage space available for backups in low speed storage of the first computer.

14. The system, as set forth in claim 12, wherein the message indicates an inventory of currently stored backups on the first computer.

15. The system, as set forth in claim 12, wherein to store a backup on the first computer from at least one of the plurality of computers in the computer group, the processor is configured to execute the instructions stored in the memory to cause the system to select the first computer based on the first computer having the largest amount of storage space available for backups among the computers in the computer group.

16. The system, as set forth in claim 12, wherein to store a backup on the first computer from at least one of the plurality of computers in the computer group, the processor is configured to execute the instructions stored in the memory to cause the system to select the first computer based on the first computer having the largest amount of high speed storage space available for backups among the computers in the computer group.

17. The system, as set forth in claim 12, wherein to store a backup on the first computer from at least one of the plurality of computers in the computer group, the processor is configured to execute the instructions stored in the memory to cause the system to select the first computer based on the absence, presence or age of previous backups on the first computer.

18. The system, as set forth in claim 12, wherein to store a backup on the first computer from at least one of the plurality of computers in the computer group, the processor is configured to execute the instructions stored in the memory to cause the system to initially store the backup on high speed storage of the first computer and move the backup to low speed storage of the first computer after a maximum age of the backup is exceeded.

\* \* \* \* \*